May 27, 1930.  J. GARVIE  1,760,826
LIQUID MEASURING AND DELIVERING APPARATUS
Filed Oct. 20, 1928  7 Sheets-Sheet 1

Fig.1.

INVENTOR.
JAMES GARVIE
per George Hughes.
Attorney.

INVENTOR.
JAMES GARVIE
per George Hughes
Attorney

May 27, 1930.  J. GARVIE  1,760,826
LIQUID MEASURING AND DELIVERING APPARATUS
Filed Oct. 20, 1928  7 Sheets-Sheet 5

Fig. 7.

INVENTOR.
JAMES GARVIE
per George Hughes
Attorney

May 27, 1930.  J. GARVIE  1,760,826
LIQUID MEASURING AND DELIVERING APPARATUS
Filed Oct. 20, 1928  7 Sheets-Sheet 7

Fig.10.

INVENTOR.
JAMES GARVIE
per George Hughes.
Attorney

Patented May 27, 1930

1,760,826

UNITED STATES PATENT OFFICE

JAMES GARVIE, OF LONDON, ENGLAND

LIQUID MEASURING AND DELIVERING APPARATUS

Application filed October 20, 1928, Serial No. 313,919, and in Great Britain March 15, 1928.

This invention relates to liquid measuring and delivering apparatus and is suitable for use in connection with the sale of liquids employed for use with motor road vehicles. Particularly does this invention lend itself to the measuring and delivering of lubricating and like oils of a heavy nature. The primary object of my invention is to provide a simple and reliable form of apparatus which will be easy to manufacture and will not involve trouble and expense in maintenance, so as to readily appeal to garage proprietors and others interested in the sale of oils. Another object of my invention is to enable each measured volume of liquid to be visible to the purchaser.

In order that this invention may be clearly understood and readily carried into effect, four sheets of drawings are appended herewith illustrating two embodiments of same and wherein.

Referring to the drawings (Figs. 1 to 9) the apparatus includes a number of glass cylindrical measuring chambers 1 each fitted with a cap 2 and base 3, and supported individually by horizontal arms 4 connected to a vertical plate 5 and more particularly described hereinafter. The caps 2 are connected by pipes 6 to a common horizontal overhead pipe 7 which at a suitable point in its length has connected to it a rearwardly extending pipe connected to the upper end of a suction cylinder 9 in which is slidable a piston (not shown) which when required is moved downwards to create suction in the measuring chambers 1.

The said piston is normally at the top of its cylinder, being maintained there by a strong coiled compression spring located between the piston and the base of the cylinder. The piston is carried by a vertical rod 10 slidable through a boss in the base plate of the cylinder and extends downwards, its lower end being pivotally connected to the upper end of a link 10ª connected to a rigid lever adapted to be operated to draw the piston downwards and thereby create suction in the measuring chamber. The said lever is preferably a foot operated one-piece treadle lever 11 pivoted at one end to a bracket 12 and readily accessible by the operator's foot at its other end, this latter end being fitted with a foot rest 13 and preferably located at such a distance beneath the measuring chambers that the measuring chambers are approximately in the level of a normal person's eyes. The foot engaging end 13 of the lever 11 can be equipped with a pawl (not shown) riding over an arcuate ratchet 14 to hold the lever in the depressed position, and adapted to be released by a relatively movable pedal 15 pivotally mounted on the lever and adapted to be engaged upon depression of the pedal by the operator's foot. The arcuate ratchet 14 may take the form of a pair of rigid arcuate metal bars between which the lever 11 is guided.

Each measuring chamber as previously stated, has its lower end closed by a base plate 3 and this has a threeway rotary cock 16 which in one position opens a vertical supply and discharge opening 17 (see Fig. 7) in the centre of said base plate 3, and in another position closes said opening and connects the measuring chamber 1 to a horizontal supply passage passing axially through the arm 4 which branches off from the cock 16 and is connected by a suitable extension 4ª (see Fig. 3) and elbow to a depending pipe 18 connected to one of a number of drums or other vessels 19 (see Fig. 1) containing the liquids to be measured and delivered, so that the liquid is drawn up from said drum into the measuring chamber 1 when the said piston in the cylinder 9 is depressed and the said cock 16 is in the appropriate position for charging the measuring chamber.

The supply to each of the measuring chambers is cut off when it is full, by means of a conical or other suitable valve 20 (see Fig. 7) operating in the upper cap 2 of the measuring chamber, the valve being normally open, but raised by the liquid when the liquid reaches the valve. The raising of the valve will bring it under the influence of the suction created by the moving piston in the suction cylinder 9 and will close the suction passage 6. The cock 16 may now be actuated to discharge the selected measuring chamber, and the lever 11 released by operation of the pedal 15, when the piston will rise under the action of its spring and set up pressure in the measuring chamber to accelerate the outflow of the liquid. A restricted orifice can if desired by provided in the upper cap of the cylinder 9 containing the piston to release some of the air as the piston ascends, and the orifice being closed by a non-return valve as the piston descends.

Figure 7:
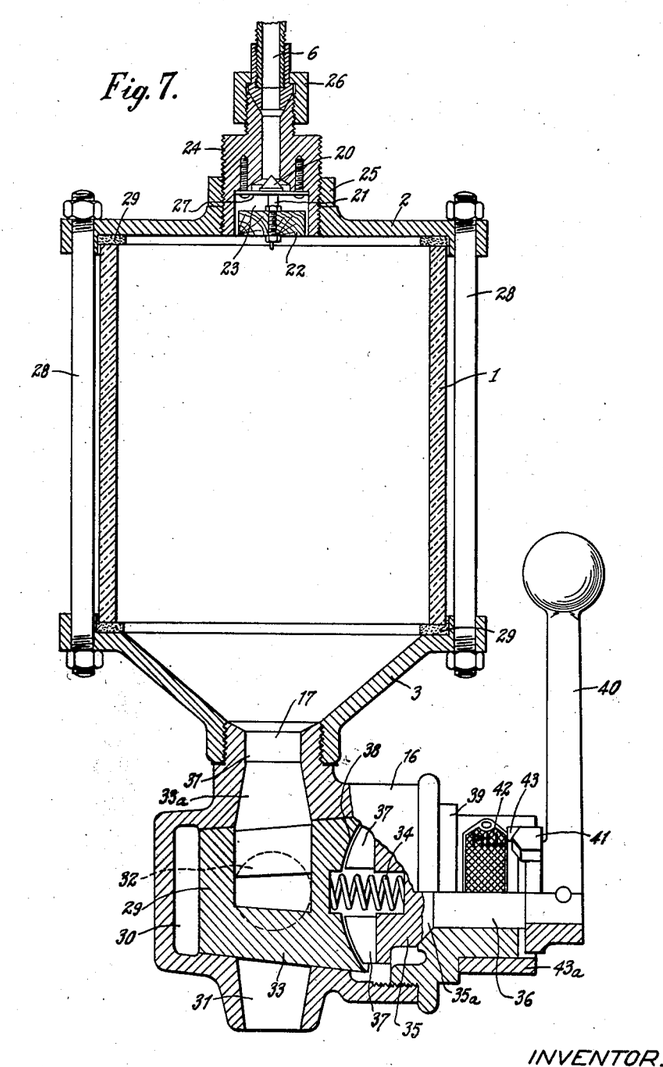
Fig. 7 is a sectional front elevation through a measuring chamber and the control cock provided with each measuring chamber.
Figure 8:
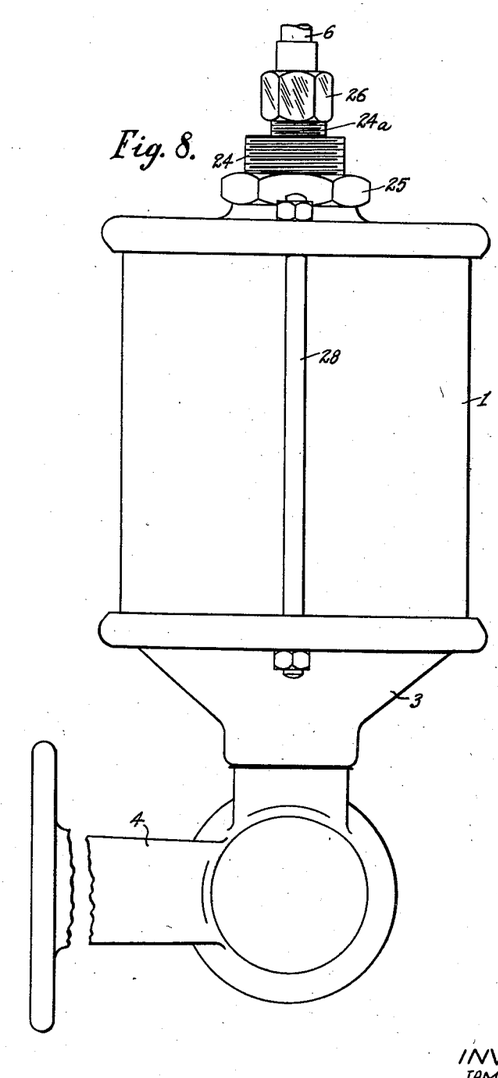
Fig. 8 is a side elevation of a measuring chamber.

Each of the valves 20 for closing the suction passages 6 preferably comprises a conical member as shown in Fig. 7, having a depending shank 21 to which is attached a small float 22 located in a space 23 formed in a plug 24 threaded into the bossed centre of the cap 2 and secured by a lock nut 25, the upper end of this plug 24 being reduced in diameter as at 24ª and threaded to receive the union nut 26 for connecting the pipe 6 to the measuring chamber. The conical valve 20 rests in its open position against a plate 27 secured across the space 23, such plate being slotted or sufficiently narrow so as not to obstruct the passage of air from the measuring chamber.

Each glass cylinder 1 can be held between the cap 2 and base plate 3 by bolts 28 passed through the cap and base plate, suitable packing 29 being interposed between the rims of the cylinder and the cap and base plate. The base plate 3 is preferably of conical form, as shown, to ensure an easy flow of liquid from the measuring chamber and to avoid retention of any of the liquid in the measuring chamber when it should be emptied.

Figure 9:
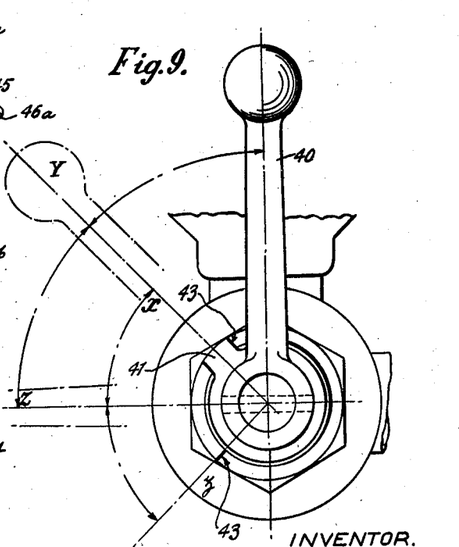
Fig. 9 is an end elevation of a control cock, showing the various positions of the cock lever.

The cock 16 is a hollow cylindrical body 30 having a diametrical through bore 31 communicating with its interior and a lateral inlet passage 32 at right angles to the through bore 31, and extending into one side of the body 30, this passage being the inlet passage in the arm 4 hereinbefore referred to, this arm 4 preferably being cast integral with the body 30. Seated across the inlet passage 32 and the through bore 31 is a conical plug 33 pressed on to a conical seating by a strong coiled compression spring 34 interposed between the plug 33 and a head 35 formed on the inner end of the valve spindle 36, the head 35 having a pair of diametrical dogs 37 slidably engaged in corresponding diametrical grooves 38 across the end of the plug 33 so that there is a constant tendency to separate the head 35 and plug 33, whereby the plug is always held tight in its seating by the spring 34. The outer face of the head 35 is formed with a conical surface 35ª which is pressed tightly against a corresponding seating in a cap 39 threaded into one end of the body 30, and if necessary secured by a grub screw or other suitable means. The spindle 36 has fixed to its outer end the operating lever 40, which is adapted to assume three positions as shown in Fig. 9, one position being the "filling" position when the T shaped or three-way port 33ª in the plug 33 connects the passage 32 with the opening 17. Another position, the "closed" position, is used when the measuring chamber is full, the plug 33 being turned through 45 degrees to close both the passage 32 and the through bore 31. The third position which is obtained by a still further rotation of the plug through 45 degrees, opens the through bore and permits the liquid to flow from the measuring chamber and be collected in any suitable vessel.

The positions of the lever 40, can be indicated by a pointer 41 which travels with the lever but at an angle thereto, the pointer having opposite it a strip 42, with the "filling," "shut", and "emptying" positions indicated thereon.

A spring press ball detent or other like device can assist in correctly locating the plug 33. The pointer 41 moves between two abutments 43 located 90 degrees apart, to limit the movement of the plug. In Fig. 9, the "filling", "shut" and "emptying" positions of the cock lever 40 are indicated respectively at X, Y and Z, the corresponding positions of the pointer 41 being indicated at $x$, $y$ and $z$. The abutments 43 may be formed in a collar 43ª fixed to the cock cap 39.

Any slight adjustment required to ensure correct measurement may be effected by raising or lowering the valve carrying plug 24 by a suitable spanner, so as to delay or advance the moment at which the float is met by the rising liquid.

Each pipe 18 adapted to depend into one of the containers 19 is rendered telescopic by being formed in two parts 18ª and 18ᵇ (see Figs. 5 and 6) the lower part 18ᵇ being slidable over the upper part 18ª, which enables each pipe 18 to be introduced into a hole in the top of a selected container 19 by raising the part 18ᵇ until its lower end clears the top of the drum, bringing the container under the pipe and then pressing the part 18ᵇ down into the container until the lower end of the part 18ᵇ rests on the base of the container. The lower end of the part 18ᵇ is equipped with a non-return valve 44 which prevents the liquid drawn into the pipe 18 returning to the container. The upper end of the part 18ᵇ is equipped with a suitable gland 45 to prevent leakage between the parts 18ᵃ and 18ᵇ, and the collar 46 of this sealing device is preferably formed with a flange 46ᵃ to provide a convenient abutment for engagement by a person when it is desired to lift the part 18ᵇ out of a container.

It will be appreciated that normally there is always a column of liquid in each pipe 18 and that it is impossible to disconnect a container by telescoping the pipe 18 until the measuring chamber cock is turned to the "filling" position, whereupon this column of liquid is forced up into the measuring chamber whilst the container is being charged and upon the pipe 18 being again lowered into the new container the liquid will flow back and the column is thus maintained and a positive continuance of operation is ensured. It will be further seen that a container cannot be disconnected whilst its measuring chamber is full or is in process of discharging.

Figure 4:
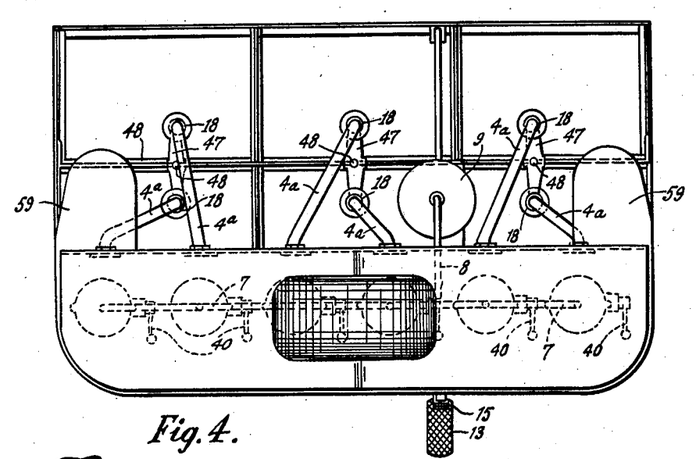
Fig. 4 is a plan view of Fig. 1.
Figures 5, 6:
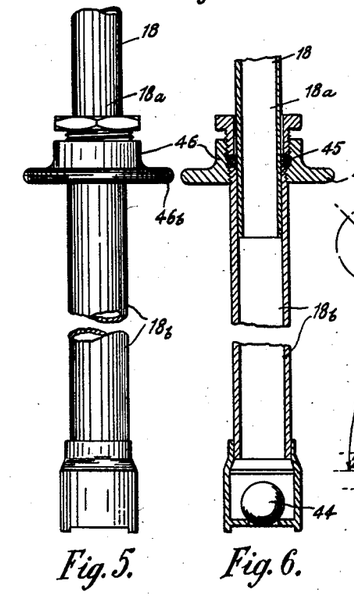
Fig. 5 is a detail broken elevation view showing the preferred method of constructing the liquid lifting pipes.
Fig. 6 is a sectional elevation of Fig. 5.

The pipes 18 are preferably arranged in two sets, i. e. a front set and a rear set as shown in Fig. 4, so that two sets of drums can be located beneath the pipes. Yokes 47 can connect each pair of pipes 18 to ensure rigidity, these yokes being fitted on to a horizontal stay 48 forming part of the frame carrying the apparatus.

The frame can be composed of a rectangular base 49 of L section metal bars and a number of symmetrically inclined uprights 50 secured to the base and united at their upper ends to a metal base plate 51 which serves as a shelf to support receptacles, for instance 52 beneath the measuring chambers 1.

Figure 1:
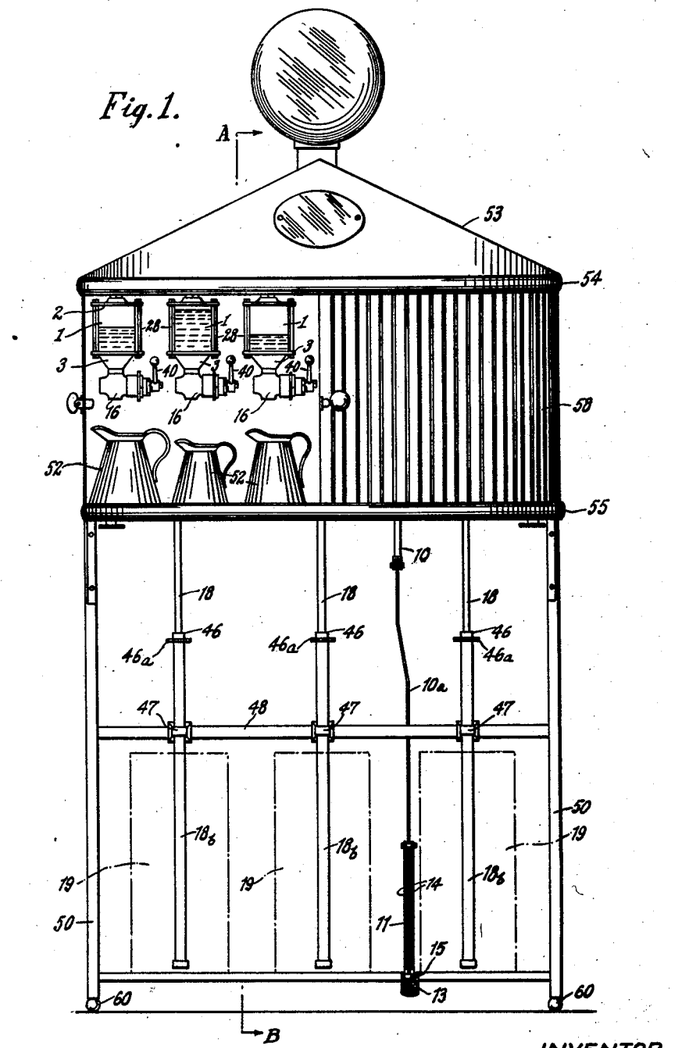
Fig. 1 is a front elevation of one embodiment.
Figure 2:
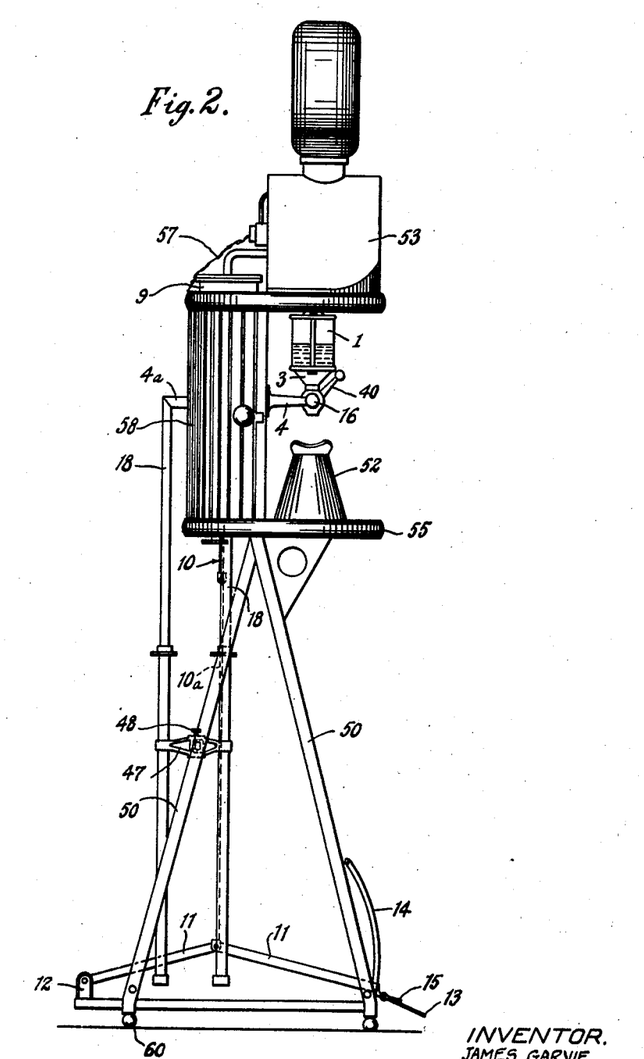
Fig. 2 is a side elevation of Fig. 1.
Figure 3:
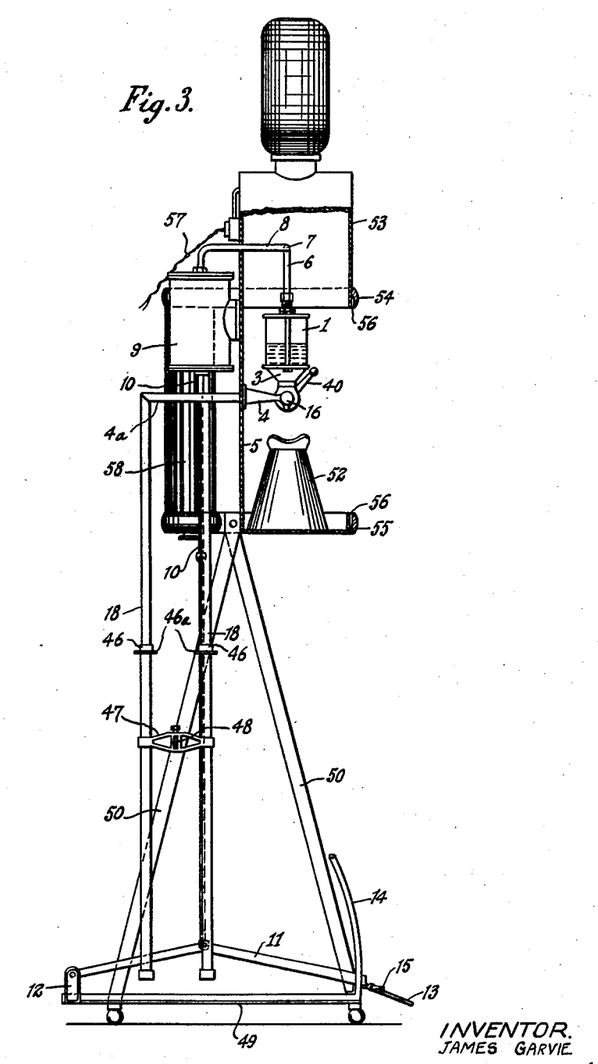
Fig. 3 is a sectional side elevation on the line A—B of Fig. 1.

Located above the measuring chambers is a hood 53 in which suitable illuminating means is preferably provided for directing light on to the measuring chambers 1, a flex for this purpose being indicated at 57 in Fig. 3, and this hood is supported by a rail 54 which is aligned with a similar rail 55 surrounding the shelf 51. The rails 54 and 55 provide channels 56 in which slide the horizontal edges of a pair of shutters 58, normally rolled in casings 59 (see Fig. 4) from which they can be drawn across the front of the measuring chambers 1 and their engaging ends locked. In Fig. 1 one of these shutters is seen in the closed position. Suitable runners 60 can be formed on the lower ends of the frame members 50 to enable the apparatus to be readily moved.

Figure 10:
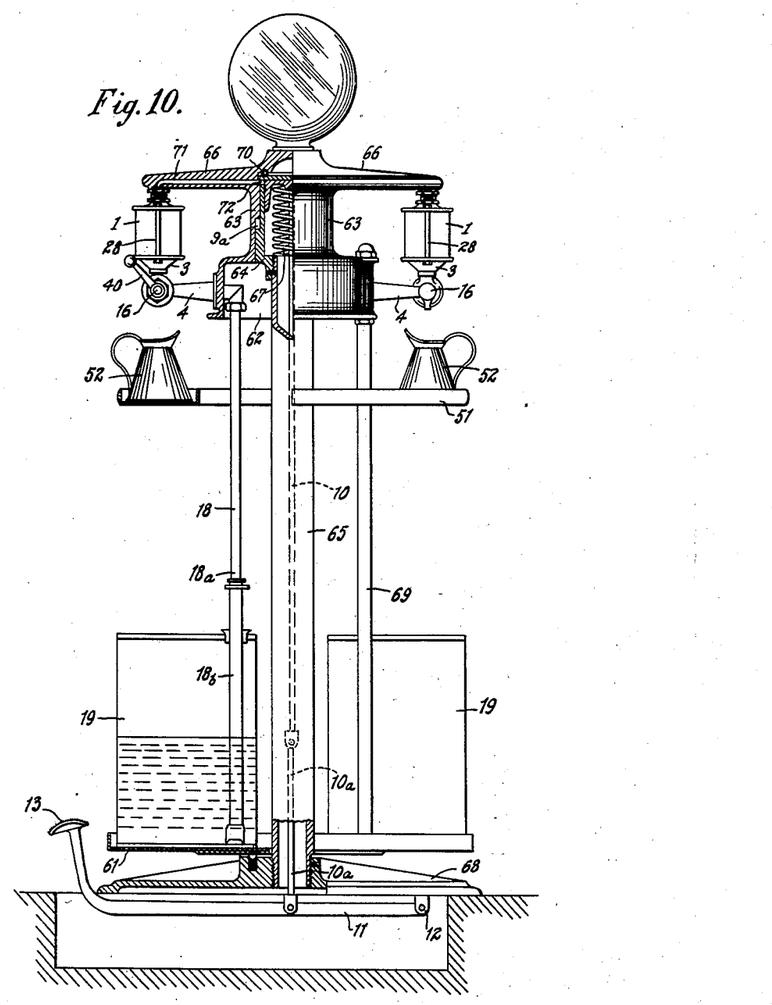
Fig. 10 is a part sectional elevation view of a modified form of this invention in which the measuring chambers and their associated parts are rotatable about a common central vertical support.

In Fig. 10 is shown an apparatus embodying the essential features of this invention, but more particularly adapted as a unit not intended to have a movement of translation, although if desired it could be mounted on a movable base. The object of this modification is to provide a more balanced or symmetrical form of appliance to meet the demands of those who prefer a device which, for instance, can be arranged in somewhat the same manner as a kerbside pump frequently used for measuring and delivering petrol.

In this embodiment the various parts are indicated by reference numerals corresponding to the like parts on the apparatus already described. The measuring chambers 1 are identical with those previously described and each has a cock 16 and arm 4 connected by a depending pipe 18 to one of a number of drums 19 supported on a circular base plate 61. The arms 4 radiate from a hollow cylindrical skirt 62 of a sleeve 63 which is free to rotate about a concentric cylinder 64 fixedly attached to the upper end of a column 65 constituting the main central support of the apparatus. The sleeve 63 has a flanged upper part 66 which receives the upper ends of the measuring chambers 1, for instance the threaded plugs 24 (shown in Fig. 7) can be threaded into the flange 66.

The cylinder 64 serves the same purpose as the cylinder 9, for applying suction to the measuring chambers 1, and it accommodates a piston 9ᵃ which is normally maintained at the top of the cylinder 64 by a strong coiled spring 67 resting on the annular base of the cylinder. A piston rod 10 is pivotally connected at its lower end to a link 10ᵃ connected to a lever 11 having a foot pedal 13 pivoted to a bracket 12 which can be attached to a base 68 into the centre of which is fixed the column 65. This base 68 can carry a depending arcuate ratchet bar equivalent to the ratchet bar 14, the foot pedal 13 of the lever 11 having a relatively movable pawl-operating pedal for releasing the lever 11 after drawing down the piston 9ᵃ.

The plate 61 for supporting the drums 19 is suspended from the skirt 62 by a suitable number of vertical rods 69, and an easy turning of the drums 19, measuring chambers 1 and flange 66 about the fixed column 65 and the cylinder 64 is obtained by ball bearings 70 between the upper head of the cylinder and the centre of the flange 66.

The upper end of the interior of the cylinder 64 is connected to all of the measuring chambers by radial passages 71, equivalent to the pipes 8. These passages 71 register with holes 72 in the upper end of the cylinder 64 when the measuring chambers 1 are in a predetermined position.

If desired a shutter arrangement similar to the shutters 58 shown with the other apparatus may be provided between the flange 66 and the support 51 located beneath the measuring chambers 1. The support 51 in this instance can be an annular plate secured to the pillar 65. Instead of shutters similar to 58 the apparatus may be contained in a cylindrical cover having a door for access to one or more of the measuring chambers.

It will be understood that normally all of the measuring chambers are full of liquid, so that when one is emptied it will be the only chamber under suction when the pump is operated.

What I claim is:—

1. Apparatus for measuring and delivering liquid comprising a number of measuring chambers connected at their upper ends to a common manually operated pump for extracting air from the chambers and supplying air under pressure thereto, a separate main liquid container for each measuring chamber, a pipe with each measuring chamber connecting it to its own liquid container, and a hand cock fitted to the base of each measuring chamber for controlling the flow of liquid into and out of each chamber.

2. Apparatus for measuring and delivering liquid comprising a number of measuring chambers which are provided with means for connecting each of them to its own source of liquid supply, and a multi-way cock with each measuring chamber for selectively connecting the measuring chambers to the appropriate sources of liquid supply, isolating the measuring chambers therefrom, and discharging the contents of the measuring chambers, each measuring chamber being connected to a cylinder having a piston therein adapted to be moved for rarefying the air in the measuring chambers, said cylinder having a capacity greater than any one of the measuring chambers and being common to all of the measuring chambers.

3. Apparatus for measuring and delivering liquid comprising a number of measuring chambers which are provided with telescopic pipes for connecting each of them to its own main liquid container, and a multi-way cock with each measuring chamber for selectively connecting the measuring chambers to the appropriate sources of liquid supply, isolating the measuring chambers therefrom, and discharging the contents of the measuring chambers, all of the measuring chambers being connected individually to a cylinder having a piston therein adapted to be moved in one direction for rarefying the air in the measuring chambers, and in the other direction for setting up pressure in the measuring chambers, said cylinder having a capacity greater than any one of the measuring chambers, said piston being connected for movement in one direction to a foot operated lever, and a spring for moving it in the other direction.

4. In apparatus for measuring and delivering liquid a plurality of measuring chambers, a manual pump common to all of the measuring chambers for successively creating a vacuum and air pressure in the measuring chambers, and means for selectively delivering liquid from the measuring chambers, said measuring chambers being arranged in a row between a supporting surface for vessels adapted to be supplied with liquid from the measuring chambers and an upper cover, means being provided for enclosing the space between said supporting surface and the upper cover within a movable wall, for instance by means of a sliding shutter arrangement.

5. Liquid measuring and delivering apparatus comprising a support for a number of measuring chambers the upper end of each of which is connected via a cut off valve to a manual pump, the pump being common to all of the measuring chambers and being adapted to alternately create vacuum and air pressure in a selected measuring chamber, the lower end of each measuring chamber being fitted with a control cock having a hand lever whereby it can be moved to connect the selected measuring chamber to its own source of liquid supply or to cut off the supply of liquid to the measuring chamber, said control cock being adapted to be moved to a position to completely empty the measuring chamber, said measuring chambers being arranged in a row between a supporting surface for vessels adapted to be supplied with liquid from the measuring chambers and an upper cover, means being provided for enclosing the space between said supporting surface and the upper cover within a movable wall, for instance by means of a sliding shutter arrangement.

6. Apparatus for measuring and delivering liquid comprising a suction and compression pump connected to a number of measuring chambers which are provided with means for connecting each of them to its own source of liquid supply, and a multi-way cock with each measuring chamber for selectively connecting the measuring chambers to the appropriate sources of liquid supply, isolating the measuring chambers therefrom, and discharging the contents of the measuring chambers, said pump comprising a cylinder having a piston therein adapted to be moved for rarefying the air and to set up air pressure in the measuring chambers, said cylinder having a capacity greater than any one of the measuring chambers, said piston being connected for operation to a foot operated lever, a coiled spring for moving the piston in one direction, said measuring chambers being arranged in a row between a supporting surface for vessels adapted to be supplied with liquid from the measuring chambers and an upper cover, means being provided for enclosing the space between said supporting surface and the upper cover within a movable wall, for instance by means of a sliding shutter arrangement.

7. Apparatus for measuring and delivering liquid comprising a suction and compression pump connected to a number of measuring chambers which are provided with means for connecting each of them to its own source of liquid supply, and a multi-way cock with each measuring chamber for selectively connecting the measuring chambers to the appropriate sources of liquid supply, isolating the measuring chambers therefrom, and discharging the contents of the measuring chambers, said pump comprising a cylinder having a piston therein adapted to be moved for rarefying the air and to set up air pressure in the measuring chambers, said cylinder having a capacity greater than any one of the measuring chambers, said piston being connected for operation to a foot operated lever, a coiled spring for moving the piston in one direction, said measuring chambers being arranged in a row between a supporting surface for vessels adapted to be supplied with liquid from the measuring chambers and an upper cover, means being provided for enclosing the space between said supporting surface and the upper cover within a movable wall, for instance by means of a sliding shutter arrangement, the measuring chambers being disposed around a main central support.

8. In apparatus for measuring and delivering liquid a plurality of measuring chambers, a manual pump common to all of the measuring chambers for alternately creating a vacuum and air pressure in a selected one of the measuring chambers, and means for selectively delivering liquid from the measuring chambers, said measuring chambers being arranged in a row between a supporting surface for vessels adapted to be supplied with liquid from the measuring chambers and an upper cover, means being provided for enclosing the space between said supporting surface and the upper cover within a movable wall, for instance by means of a sliding shutter arrangement, the measuring chambers being disposed about said pump common to all of the measuring chambers and connected to the upper ends of the measuring chambers by radial passages, the lower ends of the measuring chambers being connected via a control cock to drums or other vessels supported in fixed relationship beneath them, said pump consisting of a cylinder with a vertical axis fixed on the upper end of a supporting column and having reciprocating therein a piston, the measuring chambers being carried by a concentric structure rotatable about said cylinder.

9. Apparatus for measuring and delivering liquid comprising a number of measuring chambers connected at their upper ends to a common manually operated pump for extracting air from the chambers and supplying air under pressure thereto, a separate main liquid container for each measuring chamber a pipe with each measuring chamber connecting it to its own liquid container, and a hand cock fitted to the base of each measuring chamber for controlling the flow of liquid into and out of each chamber, each measuring chamber having at its upper end a valve attached to a float for cutting off the suction to each measuring chamber when it is fully charged with liquid, said valve being relatively movably carried by a body threaded for adjustment into the measuring chamber for the purpose set forth.

10. Apparatus for measuring and delivering liquid comprising a number of measuring chambers connected at their upper ends to a common manually operated pump for extracting air from the chambers and supplying air under pressure thereto, a separate main liquid container for each measuring chamber, a pipe with each measuring chamber connecting it to its own liquid container, and a hand cock fitted to the base of each measuring chamber for controlling the flow of liquid into and out of each chamber, the measuring chambers and the containers of the liquid from which the measuring chambers receive their supply being carried by a frame adapted to be readily moved from place to place.

In witness hereof I have signed this specification.

JAMES GARVIE.